(12) United States Patent
Asa et al.

(10) Patent No.: US 9,342,744 B2
(45) Date of Patent: May 17, 2016

(54) SURVEILLANCE IMAGE RETRIEVAL APPARATUS AND SURVEILLANCE SYSTEM

(75) Inventors: Yasuhiro Asa, Tama (JP); Seiichi Hirai, Koshigaya (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 1039 days.

(21) Appl. No.: 12/840,337

(22) Filed: Jul. 21, 2010

(65) Prior Publication Data

US 2011/0019003 A1  Jan. 27, 2011

(30) Foreign Application Priority Data

Jul. 22, 2009 (JP) ................... 2009-170710

(51) Int. Cl.
*H04N 7/18* (2006.01)
*H04N 5/225* (2006.01)
(Continued)

(52) U.S. Cl.
CPC ........ *G06K 9/00771* (2013.01); *G06K 9/00221* (2013.01); *G06K 9/033* (2013.01); *G06K 9/0063* (2013.01); *G06K 9/00248* (2013.01); *G06K 9/00295* (2013.01); *G06K 9/6253* (2013.01); *G06K 2009/00328* (2013.01); *H04L 67/10* (2013.01)

(58) Field of Classification Search
CPC ............. G06K 2009/00328; G06K 9/033; G06K 9/00013; G06K 9/00221; G06K 9/00248; G06K 9/00261; G06K 9/00268; G06K 9/0063; G06K 9/00295; G06K 9/00771; G06K 9/00785; G06K 9/00778; G06K 9/00738; G06K 9/6253; H04L 67/10

USPC .......... 348/143, 148–150, 151, 155, 159, 169
See application file for complete search history.

(56) References Cited

U.S. PATENT DOCUMENTS 5,751,345 A * 5/1998 Dozier .............. G08B 13/19641
                                                   348/153
7,403,643 B2 * 7/2008 Ianculescu ......... G06K 9/00228
                                                   382/118
(Continued)

FOREIGN PATENT DOCUMENTS

JP        2005-227957        8/2005

*Primary Examiner* — Farzana Huq
(74) *Attorney, Agent, or Firm* — Baker Botts L.L.P.

(57) ABSTRACT

Disclosed is a surveillance image retrieval apparatus capable of generating an image representing a search result that a surveillant can visually confirm, even if a face image used is not suitable for the visual identification of a person. The surveillance image retrieval apparatus includes a surveillance image acquirer, which acquires surveillance images; a feature amount generator, which extracts a face image from the surveillance images and generates the feature amount of the extracted face image; an image feature amount memory for storing a face image, a surveillance image, and other metadata associated with an acquired feature amount; a face image designator, which selects an appropriate face image in accordance with a user's input, and designates the selected face image as a query image for a person search; a similar image searcher for searching the series of surveillance images stored in the image feature amount memory for a face image similar to the designated face image; a presentation image selector, which examines surveillance images that are close to the search result in imaging time, and selects presentation surveillance images that include face images of the same person; and a screen data generator for outputting the presentation surveillance images selected.

3 Claims, 11 Drawing Sheets

(51) Int. Cl.
*G06K 9/00* (2006.01)
*G06K 9/03* (2006.01)
*H04L 29/08* (2006.01)
*G06K 9/62* (2006.01)

(56) References Cited

U.S. PATENT DOCUMENTS

| | | | |
|---|---|---|---|
| 7,460,149 B1* | 12/2008 | Donovan et al. | 348/143 |
| 2002/0175997 A1* | 11/2002 | Takata et al. | 348/143 |
| 2005/0012818 A1* | 1/2005 | Kiely et al. | 348/143 |
| 2005/0057653 A1* | 3/2005 | Maruya | 348/159 |
| 2005/0063566 A1* | 3/2005 | Beek | A61B 5/0059 382/115 |
| 2005/0207622 A1* | 9/2005 | Haupt et al. | 382/118 |
| 2005/0271250 A1* | 12/2005 | Vallone | G06K 9/00288 382/103 |
| 2008/0037838 A1* | 2/2008 | Ianculescu | G06K 9/00228 382/118 |
| 2008/0297599 A1* | 12/2008 | Donovan et al. | 348/143 |
| 2008/0303903 A1* | 12/2008 | Bentley et al. | 348/143 |
| 2012/0045096 A1* | 2/2012 | Naito et al. | 382/103 |

* cited by examiner

| REGISTRATION ID | METADATA | | | | | |
|---|---|---|---|---|---|---|
| | IMAGING TIME | CAMERA NUMBER | SURVEILLANCE IMAGE | FACE REGION INFORMATION | MOVEMENT DIRECTION | IMAGE FEATURE AMOUNT |
| 1 | 20090401105039555 | 3 | JPEG OR OTHER IMAGE DATA (BINARY DATA) | COORDINATE VALUES OF FOUR POINTS IN REGION (20,10)(50,10)(20,40)(50,40) | 270 DEGREES | FLOATING-POINT VECTOR VALUE |
| 2 | 20090401105039655 | 3 | BINARY DATA | (30,20)(60,20)(30,50)(60,50) | 270 DEGREES | FLOATING-POINT VECTOR VALUE |
| . . . | . . . | . . . | . . . | . . . | . . . | . . . |

$$d = \sqrt{(x_1-x_2)^2 + (y_1-y_2)^2}$$

$$\left( \frac{1}{n} \sum_{i=0}^{n} x_i, \ \frac{1}{n} \sum_{i=0}^{n} y_i \right)$$

SURVEILLANCE IMAGE RETRIEVAL APPARATUS AND SURVEILLANCE SYSTEM

CLAIM OF PRIORITY

The present application claims priority from Japanese Patent Application JP2009-170710 filed on Jul. 22, 2009, the content of which is hereby incorporated by reference into this application.

BACKGROUND OF THE INVENTION (1) Field of the Invention

The present invention relates to a surveillance image retrieval apparatus that searches surveillance images for human face images. The present invention also relates to a surveillance system equipped with the above-mentioned surveillance image retrieval apparatus.

(2) Description of the Related Art

When a face image is used to search surveillance images for a person, a list of face images or frame images appears on a display as a search result. A surveillant, who monitors the surveillance images, views the list displayed as the search result to verify whether the search result really indicates a targeted person. Images presented to the surveillant as the search result are not always appropriate for visual confirmation. More specifically, the face images presented as the search result may occasionally be small in size, obtained obliquely, or otherwise unsuitable for personal identification.

An optimum face image recorder disclosed in Japanese Patent Application Laid-Open publication No. 2005-227957 selects the most objectively balanced frontal face image from a series of successive surveillance images and stores the selected face image in a database. When the surveillance images include face images that are obtained within a certain period of time, the optimum face image recorder concludes that the face images represent the same face, selects the best-shot face image from them by a predetermined evaluation method, and records the selected best-shot face image. When the database for the optimum face image recorder is used to conduct a person search, only the best-shot image is selected as the result of the search. Consequently, a list of images obtained is readily used by a surveillant for visual confirmation purposes.

BRIEF SUMMARY OF THE INVENTION

The optimum face image recorder disclosed in Japanese Patent Application Laid-Open Publication No. 2005-227957 is effective as far as the best-shot face image is used to conduct a search. However, if the face image used for search purposes is not suitable for the visual identification of a person, the optimum face image recorder is not so effective because it is difficult to retrieve an image similar to the face image from the database. The present invention has been made to address the above problem, and provides a surveillance image retrieval apparatus capable of generating a search result image that a surveillant can visually confirm with ease even if a face image used for a person search is not suitable for the visual identification of a person.

In order to address the above-described problem, according to an embodiment of the present invention, there is provided a surveillance image retrieval apparatus including a surveillance image acquirer, a feature amount generator, an image feature amount memory, a face image designator, a similar image searcher, a presentation image selector, and a screen data generator. The surveillance image acquirer acquires a series of surveillance images picked up by an imager. The feature amount generator extracts a face image from the surveillance images and generates the feature amount of the extracted face image. The image feature amount memory stores a face image, a surveillance image, and other metadata associated with an acquired feature amount. The face image designator selects an appropriate face image from face images stored in the image feature amount memory or in a surveillant device in accordance with a user input (external input), and designates the selected face image as a query image for a person search. The similar image searcher searches the series of surveillance images stored in the image feature amount memory for a face image similar to the designated face image. The presentation image selector examines surveillance images that are close to the result of the search in imaging time, and selects presentation surveillance images that include face images of the same person and are easy to visually confirm. The screen data generator outputs the presentation surveillance images selected by the presentation image selector. The greatest characteristic of the surveillance image retrieval apparatus is to select presentation images by conducting a similar image search.

The present invention makes it possible to present a face image that enables a surveillant to achieve visual confirmation with ease by observing a preceding frame and a succeeding frame in relation to the result of a person search through surveillance images.

BRIEF DESCRIPTION OF THE DRAWINGS

An embodiment of the present invention will be described in detail based on the following figures, wherein.

DETAILED DESCRIPTION OF THE INVENTION

Figure 1:
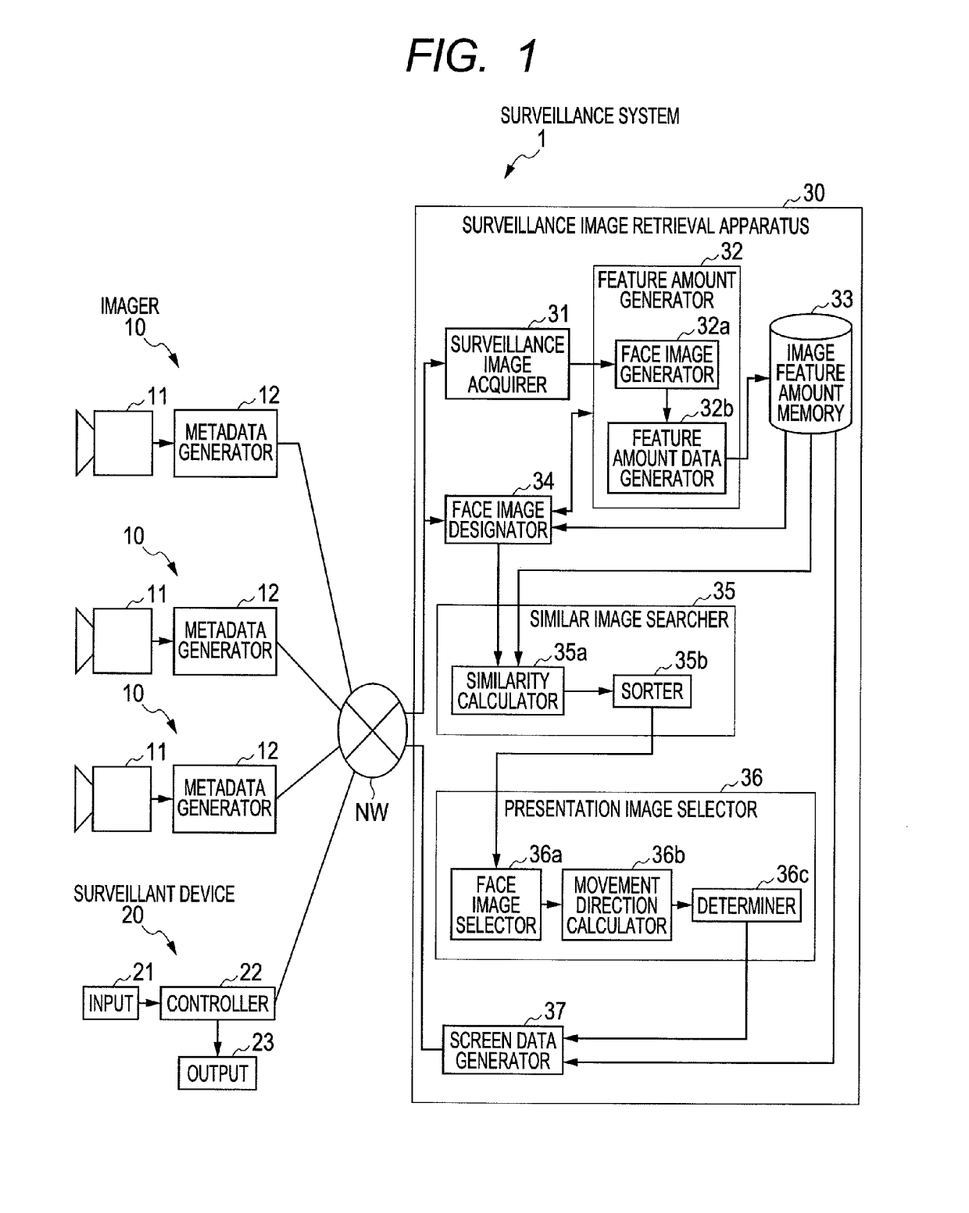
FIG. 1 is a schematic diagram illustrating a surveillance system that is equipped with a surveillance image retrieval apparatus according to an embodiment of the present invention.

An embodiment of the present invention will now be described with reference to the accompanying drawings. Like elements are designated by the same reference numerals and will not be redundantly described. FIG. 1 is a schematic diagram illustrating a surveillance system that is equipped with a surveillance image retrieval apparatus according to the present embodiment of the present invention.

As shown in FIG. 1, the surveillance system 1 according to the present embodiment of the present invention presents surveillance images of a predetermined surveillance region to a user (surveillant), and includes plural imagers 10, a surveillant device 20, and a surveillance image retrieval apparatus 30. The plural imagers 10, the surveillant device 20, and the surveillance image retrieval apparatus 30 are interconnected through a network NW to permit them to communicate with each other.

<Imagers 10>

Each imager 10 is a device that picks up an image of the predetermined surveillance region and includes a camera 11 and a metadata generator 12.

The camera 11 can acquire a series of surveillance images as digital data. For example, the camera 11 may be a color CCD (Charge-Coupled Device) camera. The series of surveillance image data acquired in the form of digital data is output to the metadata generator 12.

The metadata generator 12 handles the surveillance image data output from the camera 11 as metadata, associates the metadata with a camera ID of the related camera 11 and the imaging time of the series of image data, and outputs the resulting metadata to the surveillance image retrieval apparatus 30 through the network NW.

<Surveillant Device 20>

The surveillant device 20 is, for example, a personal computer, and includes an input 21, an output 23, and a controller 22.

The input 21 is a mouse, a keyboard, or the like, and outputs input data based on a surveillant's operation to the controller 22.

The controller 22 includes, for instance, a CPU (Central Processing Unit), a RAM (Random Access Memory), a ROM (Read-Only Memory), a HDD (Hard Disk Drive), and an input/output circuit. The controller 22 controls the operations of the input 21 and the output 23, and transmits and receives data through the network NW. In the present embodiment, the controller 22 operates in accordance with a surveillant's input operation, which is performed with the input 21, to generate face image data and face image selection data and output them to the surveillance image retrieval apparatus 30 through the network NW.

The output 23 is a display. It displays, for instance, search results that are output from the surveillance image retrieval apparatus 30.

<Surveillance Image Retrieval Apparatus 30>

The surveillance image retrieval apparatus 30 includes, for instance, a CPU (Central Processing Unit), a RAM (Random Access Memory), a ROM (Read-Only Memory), a HDD (Hard Disk Drive), and an input/output circuit. Functionally, the surveillance image retrieval apparatus 30 is divisible into a surveillance image acquirer 31, a feature amount generator 32, an image feature amount memory 33, a face image designator 34, a similar image searcher 35, a presentation image selector 36, and a screen data generator 37.

The surveillance image acquirer 31 acquires surveillance image data, that is, surveillance image data and metadata about a series of surveillance images picked up by the imagers 10, through the network NW, and outputs them to the feature amount generator 32.

The feature amount generator 32 processes the surveillance image data output from the surveillance image acquirer 31, and generates the feature amount of a face image included in a surveillance image. Functionally, the feature amount generator 32 is divisible into a face image generator 32a and a feature amount data generator 32b.

The face image generator 32a generates a face image from a surveillance image in accordance with the surveillance image data output from the surveillance image acquirer 31. Further, the face image generator 32a extracts a skin-tone portion from the surveillance image, recognizes the position of a face, for instance, from the size and shape of the skin-tone portion, and generates face image data in accordance with the recognized face position. The face image data is associated with the related surveillance image. The face image data includes a face ID and the information about the region of the face image within the surveillance image as metadata. Plural pieces of face image data are identifiably arranged and output to the feature amount data generator 32b.

The feature amount data generator 32b generates the feature amount data about the face image data in accordance with the face image data output from the face image generator 32a. The feature amount data can be calculated by a publicly known method. A method disclosed, for instance, in Japanese Patent Application Laid-Open Publication No. 2008-257649 determines the brightness gradient between a target pixel of image data and individual pixels within an area peripheral to the target pixel and the direction of such a gradient, generates a histogram for each predetermined direction, and generates data associated with the direction of peak value acquisition as feature amount data about the target pixel. The peripheral area may be simply defined as an area formed by eight pixels around the target pixel.

The face image data and the surveillance image associated with the face image data are associated with the generated feature amount data as metadata. The resulting feature amount data is then stored in the image feature amount memory 33.

The image feature amount memory 33 stores the feature amount data together with the metadata.

In accordance with a surveillant's input operation relative to the input 21, the face image designator 34 selects a face image for use in a person search. The face image is selected from those stored in the image feature amount memory 33 or stored on the RAM, ROM, or HDD included in the controller 22. The result of selection is output to the similar image searcher 35. When, for instance, a face image stored in the controller 22 is selected by the face image designator 34, the feature amount data generator 32b generates feature amount data from the face image and outputs the generated feature amount data to the similar image searcher 35.

The similar image searcher 35 searches the face image data stored in the image feature amount memory 33 for an image similar to the face image data selected by the face image designator 34. Functionally, the similar image searcher 35 is divisible into a similarity calculator 35a and a sorter 35b.

The similarity calculator 35a calculates similarities between the feature amount data about the selected face image and the feature amount data about individual face images in the image feature amount memory 33. In the present embodiment of the present invention, the similarities are represented by a parameter that decreases with an increase in similarity between two pieces of feature amount data. A publicly known method can be used to calculate similarity. When, for instance, the aforementioned brightness gradient is used for the feature amount data, the mean-square distance between feature amounts determined from two face images can be used. When, for instance, the two feature amounts are $f(x_1, y_1)$ and $f(x_2, y_2)$, respectively, the mean-square distance between them is $\sqrt{(x_1-x_2)^2+(y_1-y_2)^2}$ as indicated by the upper equation in FIG. 11. The calculated similarities are output to the sorter 35b.

The sorter 35b sorts the similarities between the feature amount data about the selected face image and the feature amount data in the image feature amount memory 33 in ascending order (from the smallest similarity parameter to the greatest). More specifically, the face images in the image feature amount memory 33 are arranged in order from the most similar image relative to the selected face image to the least similar image. Then, a predetermined number of pieces of feature amount data having relatively small similarity parameter values are selected from those arranged in ascending order of similarity parameter values, and output to the presentation image selector 36.

In accordance with a face image representing the search result generated from the similar image searcher 35, the presentation image selector 36 selects an appropriate face image, which can be visually confirmed with ease by the surveillant, from face images included in the surveillance image data prevailing before and after the search result. Functionally, the presentation image selector 36 is divisible into a face image selector 36a, a movement direction calculator 36b, and a determiner 36c.

In accordance with the face image representing the search result, the face image selector 36a selects face images of the same person from surveillance images containing the face image representing the search result and from surveillance images that are close in imaging time to the face image representing the search result. More specifically, the face image selector 36a calculates the similarity between the feature amount data about the face image representing the search result and the feature amount data about a face image in the surveillance images that are close in imaging time to a surveillance image containing the face image representing the search result. If the calculated similarity parameter value representing the similarity is smaller than a predetermined threshold value, it is concluded that the two face images depict the same person. The range of surveillance images that are close in imaging time is defined by a series of surveillance images that are picked up before and after a surveillance image containing the face image representing the search result and contain the face images of the same person. A series of face images selected by the face image selector 36a are output to the movement direction calculator 36b. Here, the surveillance images that are close in imaging time are images that are picked up by a specific imager and close in average time during which the same person is imaged. However, the average time depends on an imaging environment. The threshold value is predetermined for a specific imager in accordance with average similarity between face images that should be judged to be the face images of the same person. The threshold value may be changed depending on the intended use of the surveillance image retrieval apparatus.

In accordance with the series of face images generated from the face image selector 36a, the movement direction calculator 36b calculates the direction of movement of a person depicted by the face images. More specifically, the movement direction calculator 36b determines the direction of movement by comparing the positions of an earlier-shot face image and a later-shot face image within the series of surveillance images. A publicly known method can be used to calculate the direction of movement. For example, the direction of movement can be calculated by using a vector that is determined from the center of gravity of a face image region in a surveillance image.

Figure 11:
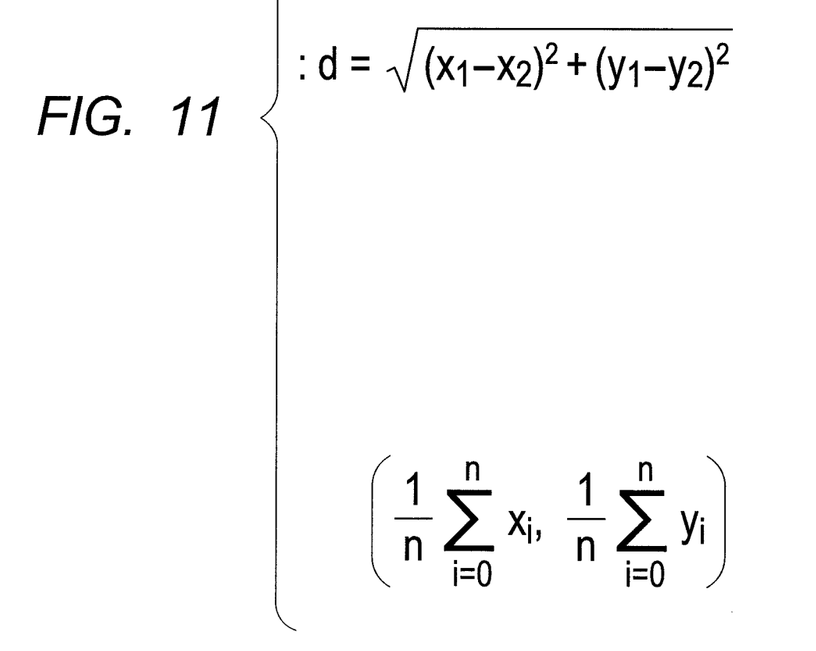
FIG. 11 is a diagram showing equations used in accordance with the embodiment of the present invention.

Here, the coordinates of the center of gravity of the face image region are $((1/n)(\Sigma xi),(1/n)(\Sigma yi))$ (n is the total number of pixels in the face image region and (xi,yi) (i=0 . . . n) are the coordinate values in the face image region as indicated by the lower equation in FIG. 11). The vector determined from the center of gravity is a vector that starts at the center of gravity of the earlier-shot face image and ends at the center of gravity of the later-shot face image. Each direction of movement calculated from the series of face images is associated with the later-shot face image, which was used for comparison, as the movement direction, and output to the determiner 36c.

In accordance with the series of face images output from the movement direction calculator 36b, the associated movement direction, and the sizes of the face images, the determiner 36c selects an image to be presented to the surveillant. More specifically, the determiner 36c searches the series of face images to retrieve face images that move in a downward direction relative to a surveillance image or move in a direction slightly deviated from the downward direction, selects the largest-size face image from the retrieved face images, and outputs the selected face image to the screen data generator 37. Although the largest face image is selected in the present embodiment, an alternative is to select a relatively sharp face image or a frontal face image.

The screen data generator 37 is an example of a search result generator that outputs the results produced by the similar image searcher 35 and the presentation image selector 36. In accordance with the result of determination by the determiner 36c and the surveillance image data stored in the image feature amount memory 33, the screen data generator 37 generates a surveillance image, which is the result of a search conducted by the similar image searcher 35, and appearance display screen data, which is used to display a surveillance image representing the result of determination by the determiner 36c.

In accordance with the surveillance image data stored in the image feature amount memory 33 or the face image data in the surveillant device 20, the screen data generator 37 can also generate query face image designation screen data, which causes the output 23 of the surveillant device 20 to display a face image that is to be designated by the surveillant and used as a query image for a person search. The generated appearance display screen data and query face image designation screen data are output to the surveillant device 20 through the network NW.

Figure 2:
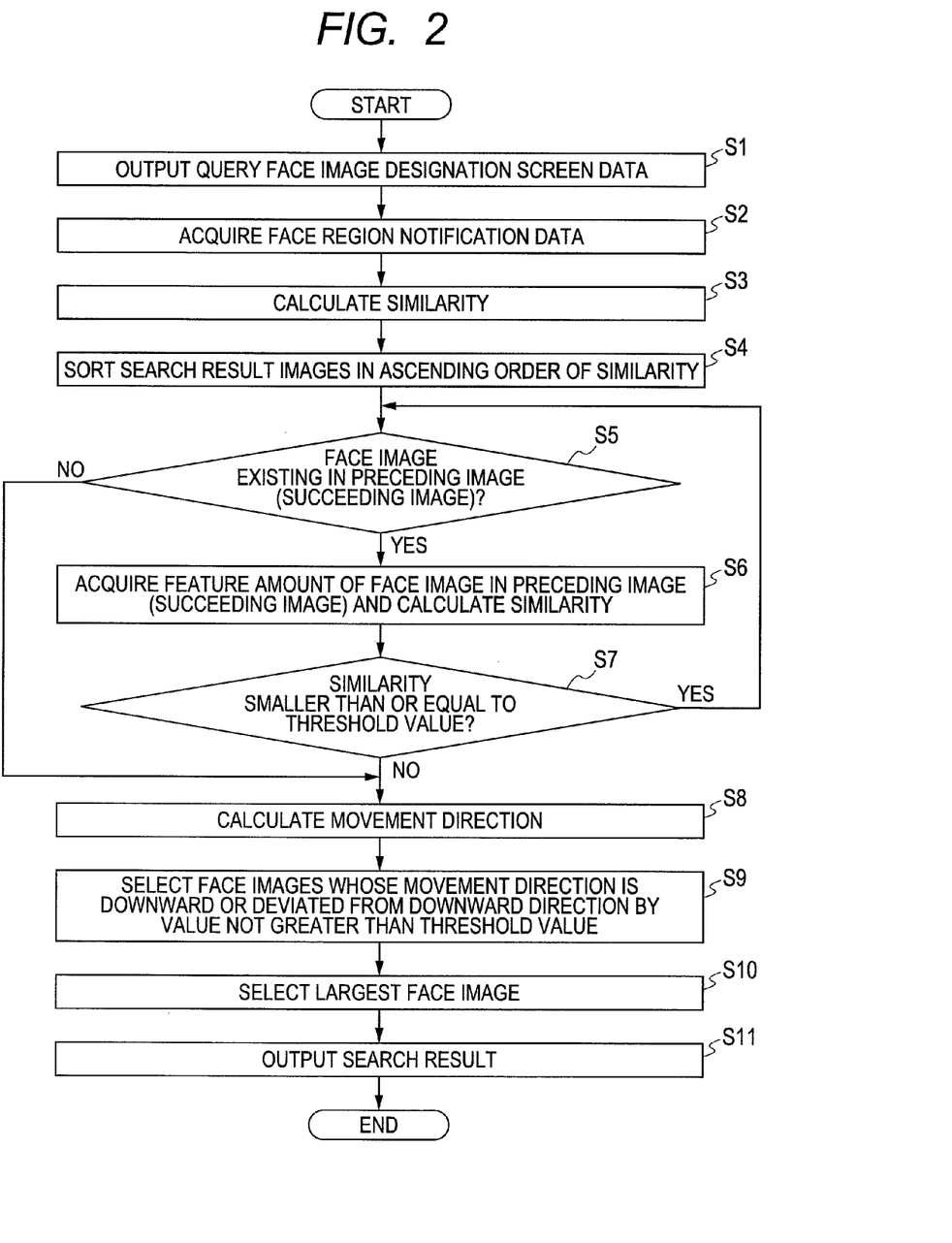
FIG. 2 is a flowchart illustrating a typical operation performed by the surveillance image retrieval apparatus according to the embodiment of the present invention.
Figure 3:
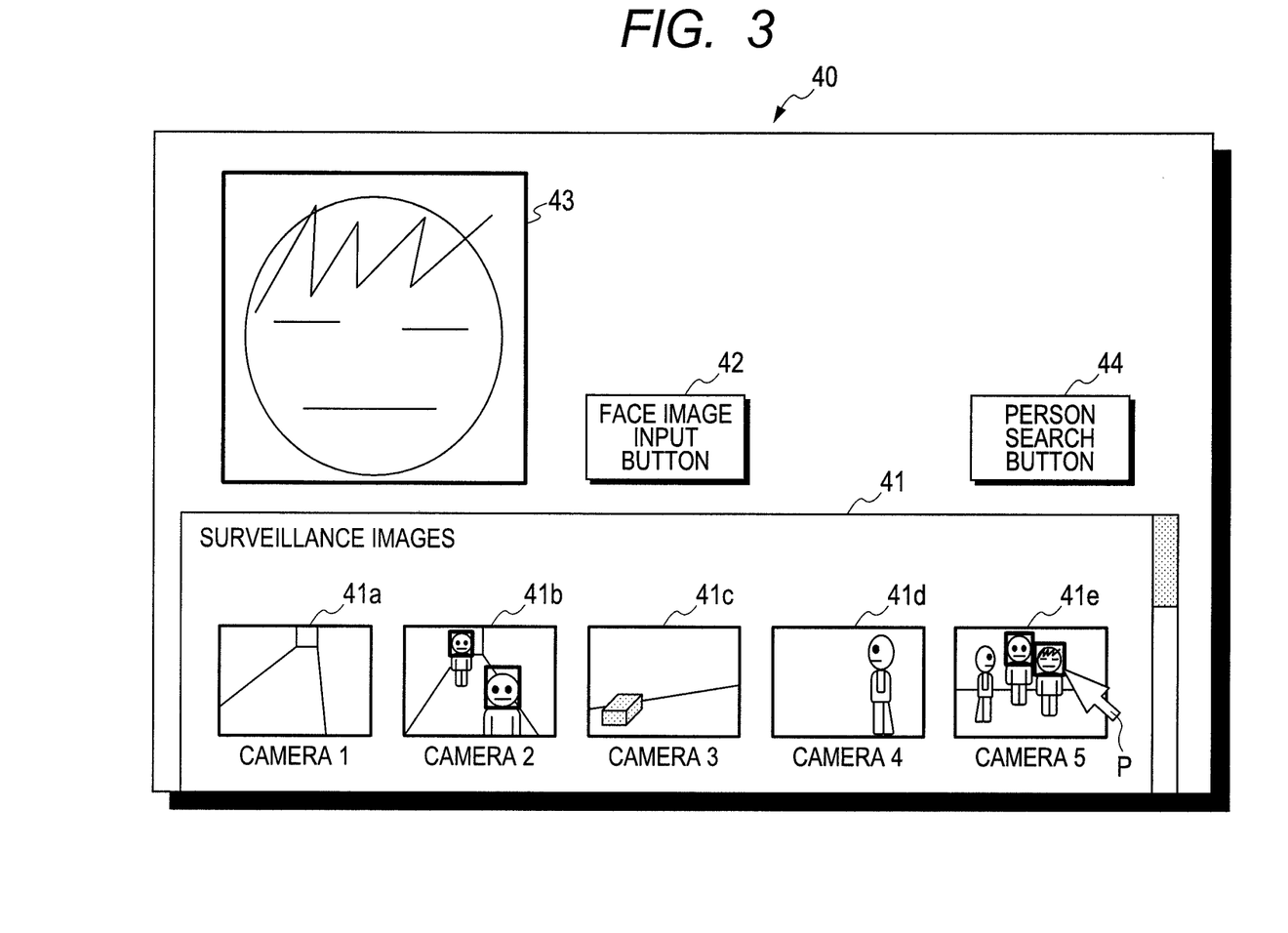
FIG. 3 is a diagram illustrating a typical screen that shows query face image designation screen data.
Figure 4:
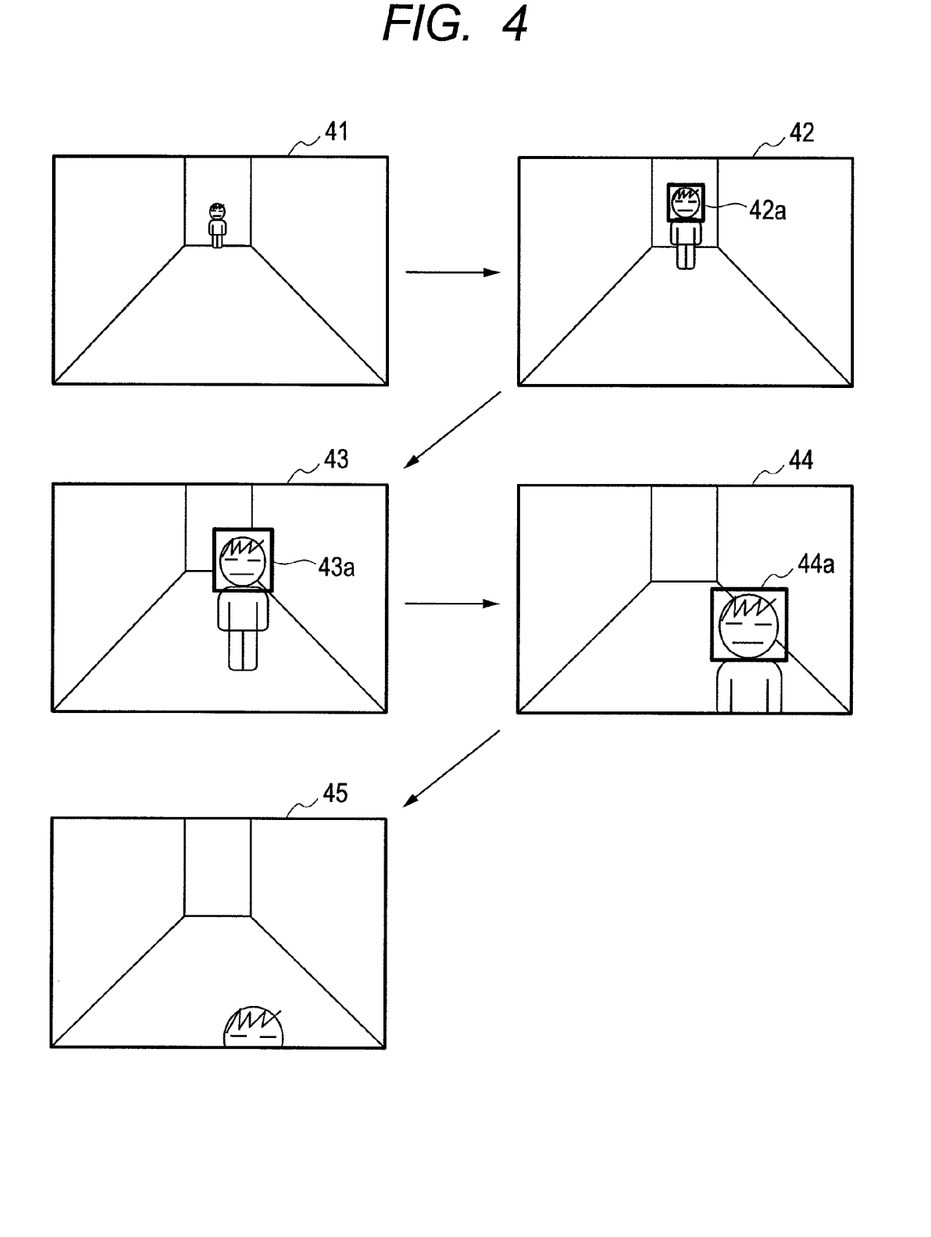
FIG. 4 is a set of drawings showing a series of surveillance images stored in an image feature amount memory.
Figure 5:
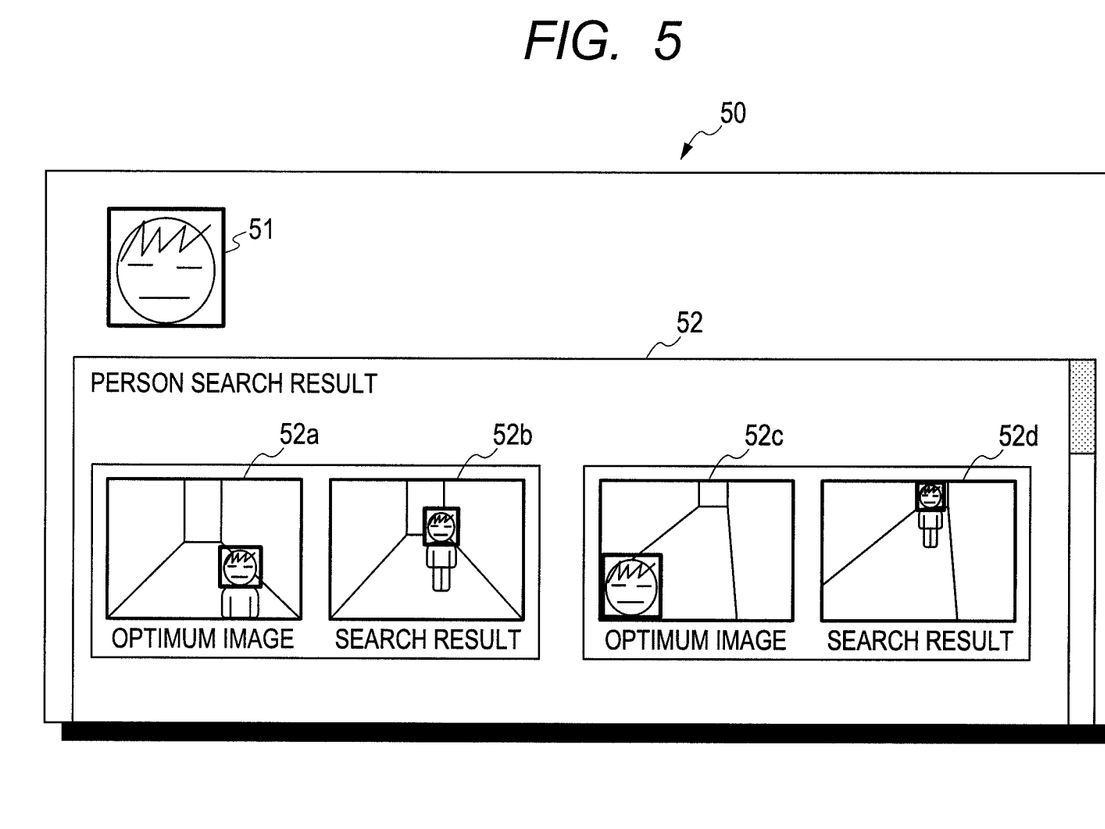
FIG. 5 is a diagram illustrating a typical screen that shows person search result display screen data.
Figure 6:
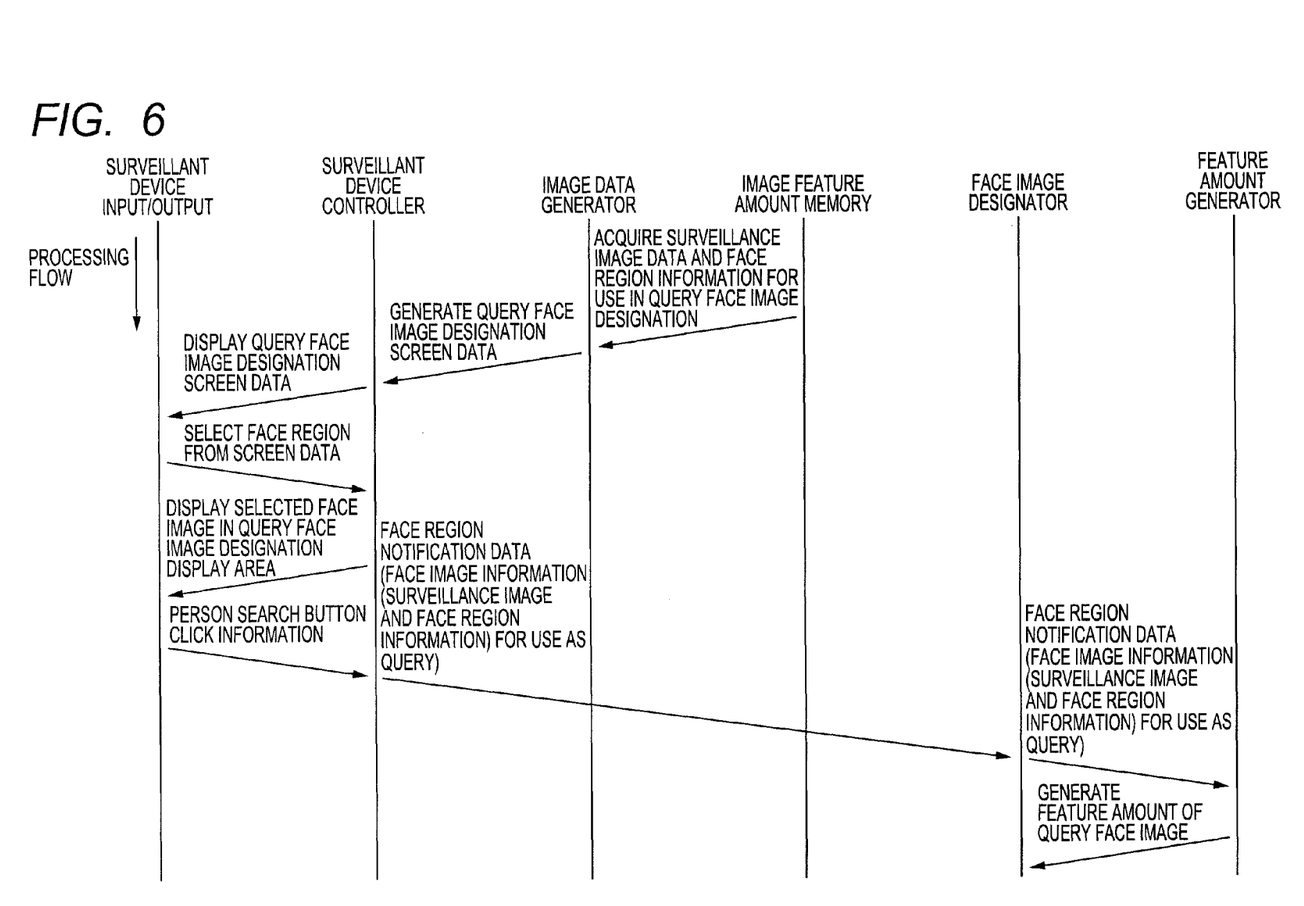
FIG. 6 is a diagram illustrating a surveillance image search operation according to the embodiment of the present invention.
Figure 7:
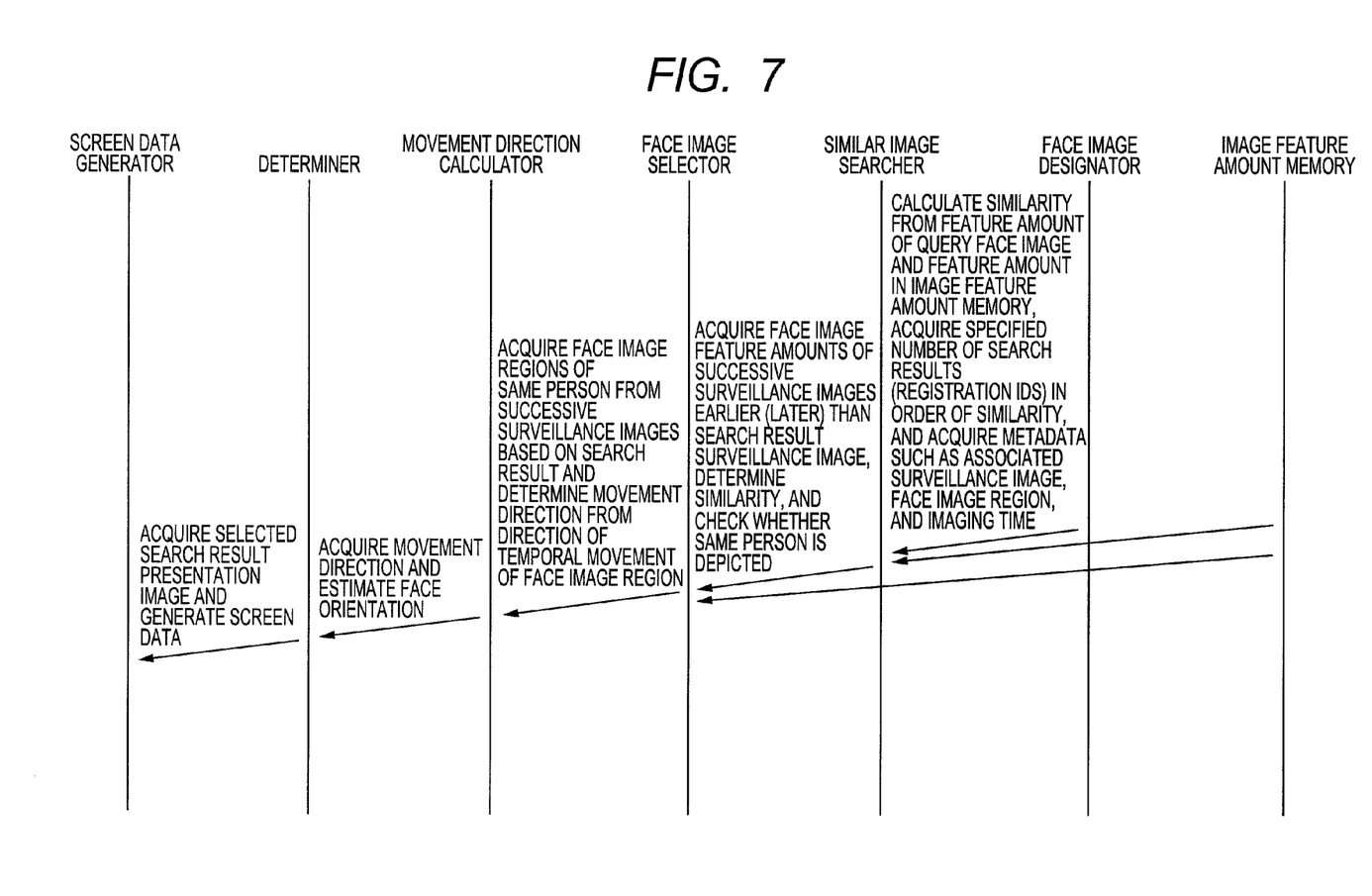
FIG. 7 is a diagram illustrating a surveillance image search operation according to the embodiment of the present invention.
Figure 8:
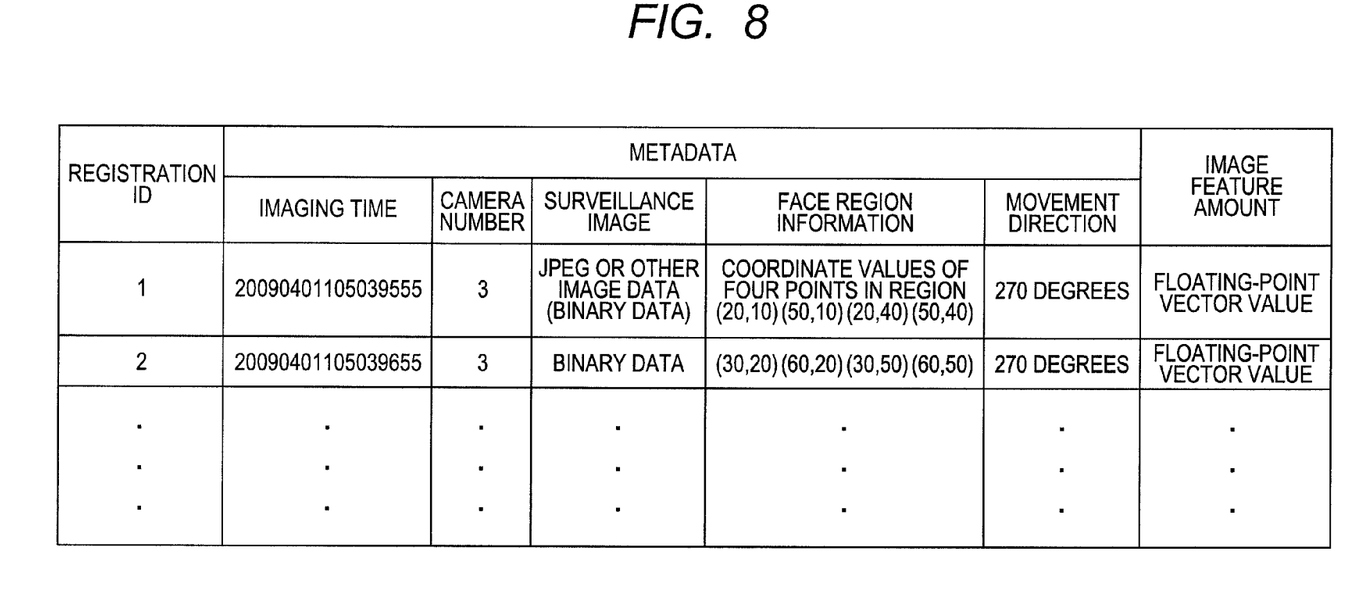
FIG. 8 is a diagram illustrating the structure of surveillance image data.
Figure 9:
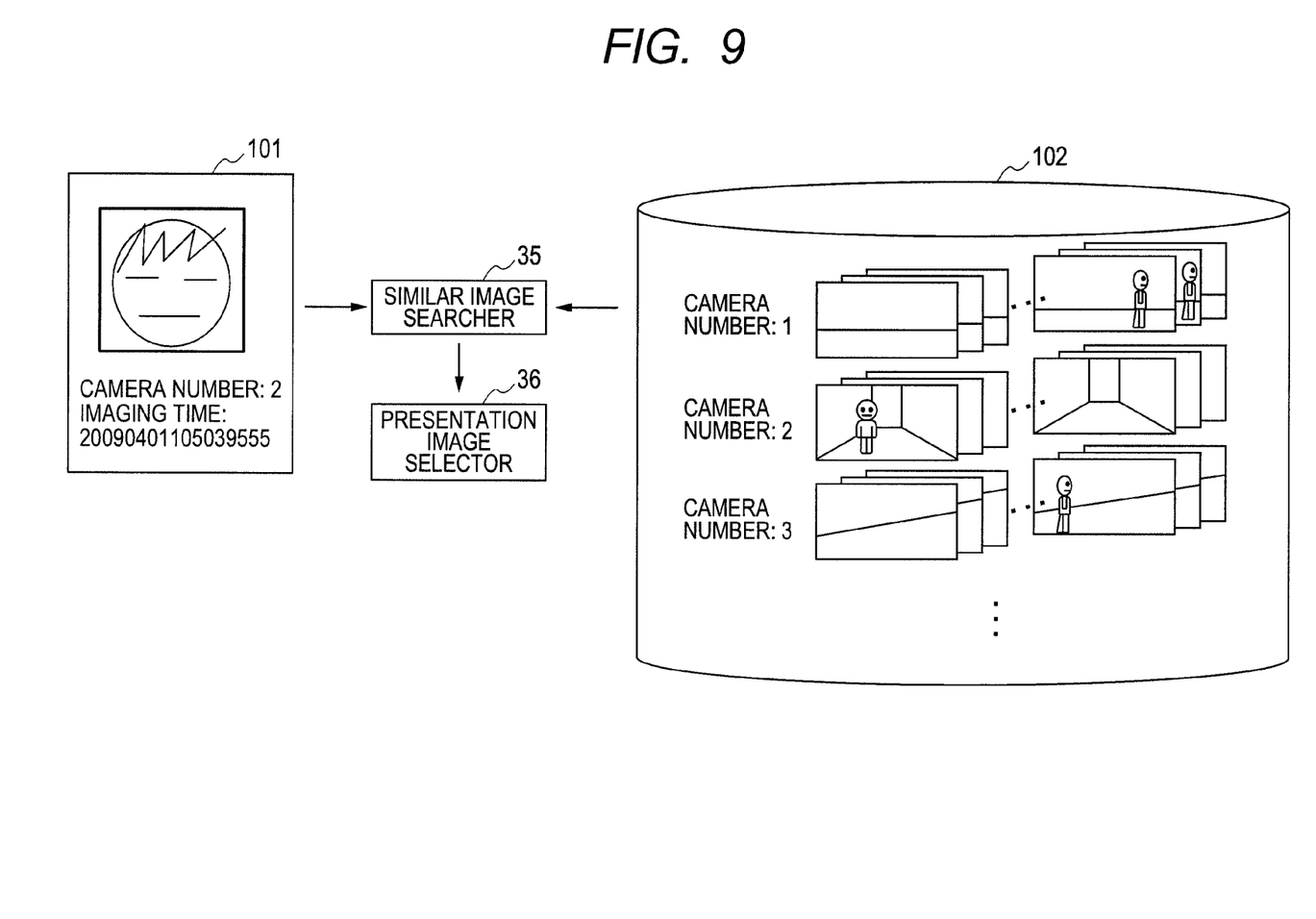
FIG. 9 is a diagram illustrating the types of data used during a process performed by a similar image searcher.
Figure 10:
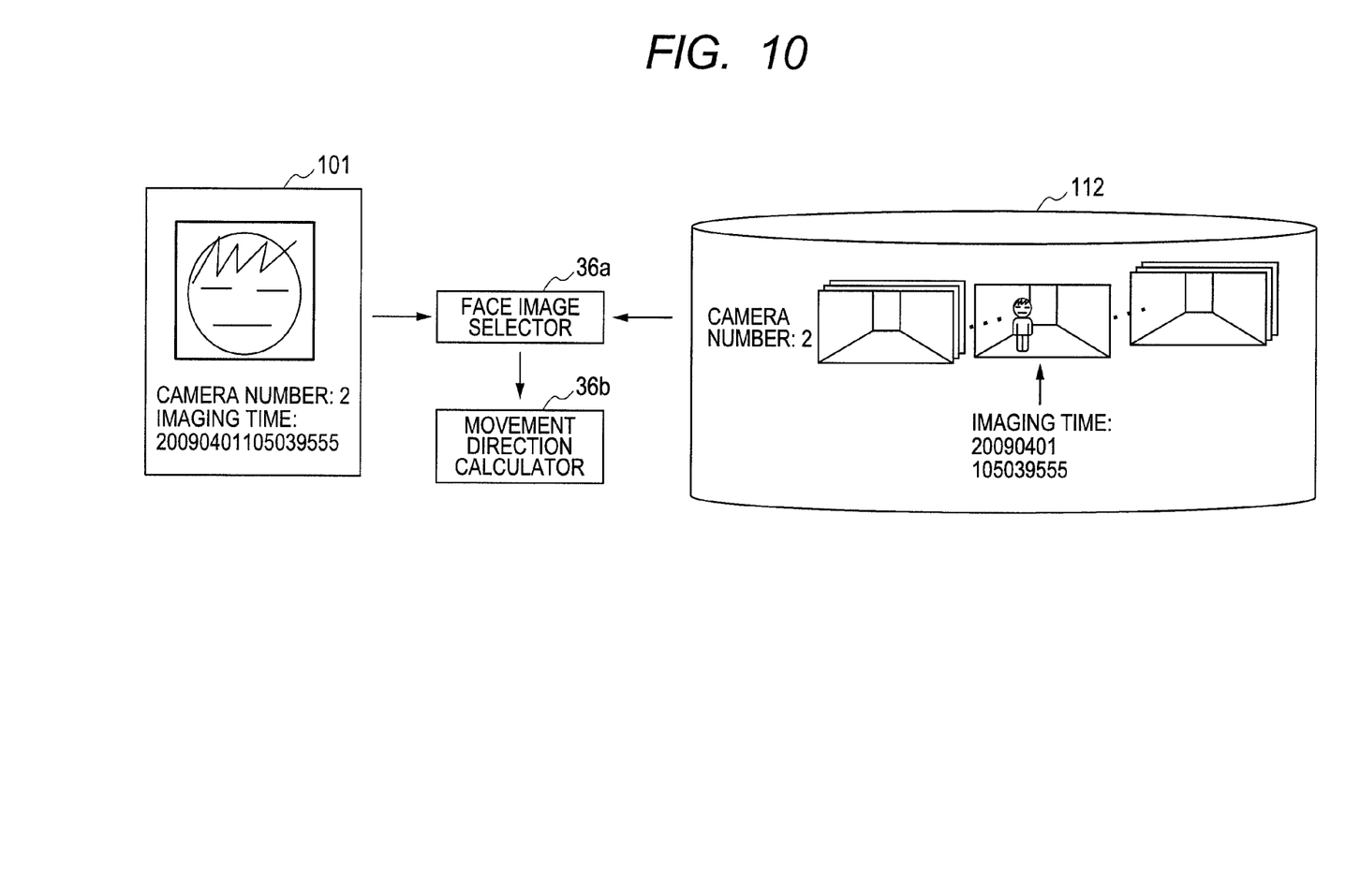
FIG. 10 is a diagram illustrating the types of data used during a process performed by a face image selector.

A first typical operation of the surveillance image retrieval apparatus 30 according to the present embodiment of the present invention will now be described with reference to FIGS. 2 to 10 (and with occasional reference to FIG. 1). FIG. 2 is a flowchart illustrating a typical operation performed by the surveillance image retrieval apparatus according to the present embodiment of the present invention. FIGS. 6 to 8 illustrate the flow of data during the operation indicated in FIG. 2. FIG. 3 is a diagram illustrating a typical screen that shows query face image designation screen data. Drawings 41 to 45 in FIG. 4 show a series of surveillance images stored in the image feature amount memory 33. FIG. 5 is a diagram illustrating a typical screen that shows person search result display screen data. FIG. 8 is a diagram illustrating the structure of surveillance image data stored in the image feature amount memory 33. FIG. 9 is a diagram illustrating the types of data used during a process performed by the similar image searcher 35. FIG. 10 is a diagram illustrating the types of data used during a process performed by the face image selector 36a.

As shown in FIG. 6, in accordance with the surveillance image data, face region information, and face image registration ID stored in the image feature amount memory 33 and the face image data stored on a storage device included in the controller 22 of the surveillant device 20, the screen data generator 37 of the surveillance image retrieval apparatus 30 first generates the query face image designation screen data that causes the output 23 of the surveillant device 20 to display screen data for allowing the surveillant to designate a face image for a person search, and outputs the generated query face image designation screen data to the surveillant device 20 through the network NW (step S1). The controller 22 of the surveillant device 20 then outputs the query face image designation screen data to the output 23. Next, the output opens a query face image designation screen 40 shown in FIG. 3 by using the query face image designation screen data. Each surveillance image entry in the image feature amount memory 33 has a data structure as shown in FIG. 8. Each surveillance image entry includes a registration ID, which is a unique management number for storage; imaging time, which is the time at which a surveillance image was picked up by an imager 10; a camera number, which is a management number assigned to the imager 10; surveillance image data; face region information, which indicates the region of a human face detected within the surveillance image; a movement direction, which indicates the direction of movement of a person depicted by the face region within the surveillance image; and an image feature amount, which is the feature amount of a face image cut out in accordance with the face region. The surveillance image is stored on an individual face region basis. Therefore, when plural face regions are detected within a surveillance image, data registration takes place in such a manner as to cover all the detected face regions.

The query face image designation screen 40 can be operated through a GUI (Graphical User Interface). As shown in FIG. 3, the query face image designation screen 40 includes a surveillance image display area 41, a face image input button 42, a query face image designation display area 43, and a person search button 44.

The surveillance image display area 41 displays surveillance images 41a-41e that are picked up by the plural imagers 10. The surveillance images 41a-41e are synchronized with each other so that surveillance images picked up at the same time are displayed together.

The surveillance image display area 41 is also capable of displaying previously obtained surveillance image data, which is stored in the image feature amount memory 33 of the surveillance image retrieval apparatus 30.

The face image input button 42 can be used to select a face image stored on the storage device included in the controller 22 of the surveillant device 20 and display the selected face image in the query face image designation display area 43.

The query face image designation display area 43 displays a face image that the surveillant uses to designate a query face image. The query face image designation display area 43 can display a face image displayed in the area for the surveillance images 41a-41e or a face image obtained through the face image input button 42. In the present example of operation, the query face image designation display area 43 displays a face region in the surveillance image 41e. The surveillance image 41e shows plural faces. Detected faces are highlighted by a rectangular face detection region 41f. The surveillant manipulates the input (mouse) 21 to move a pointer P, places the pointer P on a particular face detection region 41f of the surveillance images 41a-41e, and then clicks the input (mouse) 21. This causes the controller 22 to display the associated face region of a surveillance image in the query face image designation display area 43.

The person search button 44 is used to initiate a person search in accordance with the face image displayed in the query face image designation display area 43. When the surveillant manipulates the input (mouse) 21 to move the pointer P, places the pointer P over the person search button 44, and clicks the input (mouse) 21, the controller 22 generates a signal (face region notification data), which notifies the surveillance image retrieval apparatus 30 of a face region targeted for a search, and outputs the generated signal to the surveillance image retrieval apparatus 30 through the network NW.

Referring again to the present example of operation, when the surveillant manipulates the input (mouse) 21 to select a face region in the surveillance image 41e displayed in the query face image designation display area 43, a face image is cut out and presented to the surveillant in accordance with the associated face region information. When the person search button 44 is pressed subsequently, the controller 22 generates face region notification data and outputs the face region notification data to the surveillance image retrieval apparatus 30 through the network NW. Further, the face image designator 34 of the surveillance image retrieval apparatus 30 acquires the face region notification data (step S2), and obtains the feature amount of the face image targeted for a search. If, in this instance, the face region displayed in the query face image designation display area 43 is provided by face image input button 42, the face image is output to the surveillance image retrieval apparatus 30 as the face region notification data. Further, the face image designator 34 acquires the feature amount of the face image targeted for a search through the feature amount generator 32.

Subsequently, as shown in FIG. 7, the similarity calculator 35a of the similar image searcher 35 calculates the similarities between the feature amount of the designated face image and the feature amounts of face images stored in the image feature amount memory 33 (step S3).

Next, the sorter 35b sorts the calculated similarities in ascending order (from the smallest similarity parameter value to the greatest) (step S4). Further, the sorter 35b outputs a surveillant-specified number of feature amounts to the presentation image selector 36 together with metadata such as surveillance images and face images in ascending order of similarity parameter value. Here, as shown in FIG. 9, the similar image searcher 35 calculates the similarities between the designated face image 101 and all data 102 stored in the image feature amount memory 33.

Next, the face image selector 36a of the presentation image selector 36 checks whether a face image is detected in a surveillance image 42 immediately preceding (a surveillance image 44 immediately succeeding) a surveillance image 43 containing a face image 43a (see FIG. 4) output from the sorter 35b (step S5). If such a face image 42a (44a) is detected, the face image selector 36a acquires the feature amount of the face image in the surveillance image 42 (surveillance image 44) from the image feature amount memory 33 and calculates the similarity between the face image 43a and the face image 42a (face image 44a) (step S6). Step S7 is then performed to judge whether the calculated similarity (calculated similarity parameter value) is not greater than the threshold value. If the calculated similarity (calculated similarity parameter value) is not greater than the threshold value, step S5 is performed. In step S5, the same process as described above is performed on the next preceding surveillance image 41 (the next succeeding surveillance image 45). If the calculated similarity (calculated similarity parameter value) is greater than the threshold value, step S8 is performed. The threshold value represents the average similarity between face images that should be judged to be the face images of the same person. Here, as shown in FIG. 10, the face image selector 36a checks the similarities between the designated face image 101 and data 112 that is derived from the same camera and stored in the image feature amount memory 33 to judge whether the same person is depicted by the stored data 112.

Next, in accordance with the result of selection by the face image selector 36a, the movement direction calculator 36b calculates the direction of movement in the surveillance images by observing the earliest-shot face image 42a whose similarity parameter value is not greater than the threshold value and the second-earliest-shot face image 43a whose similarity parameter value is not greater than the threshold value (step S8). The calculated movement direction is associated with the later-shot face image 43a of the two observed face images. The movement direction calculations are performed in chronological order until no selected face images remain.

Next, in accordance with the result produced by the movement direction calculator 36b, the determiner 36c examines the selected face images to select face images whose movement direction is downward in a surveillance image or deviated from the downward direction by a value not greater than a threshold value (step S9). The determiner 36c then selects the largest face image from the selected face images and determines the selected face image as a presentation image for the surveillant (step S10). The downward direction is the direction in which a person moves, that is, the direction toward the associated imager. Although the threshold value for directional deviation depends on imaging environmental conditions such as the size of a face image that can be picked up, it represents an average error in the direction that is judged to be downward relative to each imager.

Next, in accordance with the result of determination by the determiner 36c, the screen data generator 37 generates screen data for displaying a presentation surveillance image and a search result surveillance image, and outputs the generated screen data to the surveillant device 20 through the network NW (step S11).

The controller 22 of the surveillant device 20 outputs the screen data to the output 23. The output 23 uses the screen data to display a search result display screen 50 shown in FIG. 5. As shown in FIG. 5, the search result display screen 50 includes a query face image display area 51 and a person search result display area 52.

The person search result display area 52 displays search result surveillance images 52b, 52d and optimum images 52a, 52c. From upper left to lower right, the search result surveillance images are displayed in ascending order of similarity (similarity parameter value). The optimum images, which can be visually confirmed with ease, are determined by the presentation image selector 36 and displayed together with the search result surveillance images.

While an exemplary embodiment of the present invention has been described with reference to the accompanying drawings, it should be understood that the present invention is not limited to the above-described exemplary embodiment. It will be apparent to persons skilled in the art that design changes and various other modifications can be made without departing from the spirit and scope of the present invention. For example, the feature amount generator 32 included in the surveillance image retrieval apparatus 30 may alternatively be included in the imagers 10 and in the surveillant device 20. Further, the present invention can be embodied as a surveillance image search program that causes a computer to function as the surveillance image retrieval apparatus.

What is claimed is:

1. A surveillance image retrieval apparatus comprising:
a surveillance image acquirer that acquires a series of surveillance images picked up by an imager;
a feature amount generator that extracts one or more face images from the series of surveillance images acquired by the surveillance image acquirer and generates a feature amount of each of the extracted face images included in the series of surveillance images;
an image feature amount memory that stores the extracted face images and other metadata associated with the generated feature amount of each of the face images;
a face image designator that selects an appropriate face image from the face images stored in the image feature amount memory in accordance with a user input, and designates the selected face image as a query image for a person search within the series of surveillance images;
a similar image searcher that searches the face images stored in the image feature amount memory for a face image similar to the designated face image;
a presentation image selector that examines surveillance images that are close in imaging time to the similar image retrieved as a search result and selects presentation surveillance images that contain face images of the same person as a person depicted by the similar image; and
a screen data generator that outputs the presentation surveillance images selected by the presentation image selector,
wherein the presentation image selector includes:
a face image selector that calculates similarity between a face image representing the search result and a face image in a surveillance image preceding a surveillance image containing the face image representing the search result, and, when the calculated similarity is not greater than a threshold value, concludes that the face image in the surveillance image preceding the surveillance image containing the face image representing the search result depicts the same person as the face image representing the search result, and selects the face image in the surveillance image preceding the surveillance image containing the face image representing the search result;
a movement direction calculator that calculates the direction of movement of the region of the face image selected by the face image selector in a surveillance image; and
a determiner that selects as an optimum image a surveillance image containing a largest-size face image whose movement direction calculated by the movement direction calculator is deviated from the downward direction in the surveillance image by a value not greater than a threshold value.

2. The surveillance image retrieval apparatus according to claim 1, wherein the presentation image selector includes:
a face image selector that calculates similarity between a face image representing the search result and a face image in a surveillance image succeeding a surveillance image containing the face image representing the search result, and, when the calculated similarity is not greater than a threshold value, concludes that the face image in the surveillance image succeeding the surveillance image containing the face image representing the search result depicts the same person as the face image representing the search result, and selects the face image in the surveillance image succeeding the surveillance image containing the face image representing the search result;

a movement direction calculator that calculates the direction of movement of the region of the face image selected by the face image selector in a surveillance image; and a determiner that selects as an optimum image a surveillance image containing a largest-size face image whose movement direction calculated by the movement direction calculator is deviated from the downward direction in the surveillance image by a value not greater than a threshold value.

3. The surveillance image retrieval apparatus according to claim 1, wherein the screen data generator generates a screen that simultaneously presents a search result surveillance image retrieved by the similar image searcher and an optimum image selected by the presentation image selector.

* * * * *